United States Patent [19]
Sakaue

[11] Patent Number: 5,113,051
[45] Date of Patent: May 12, 1992

[54] METHOD OF RETURNING A WIRE ELECTRODE WHEN BROKEN IN A WIRE CUT ELECTRIC DISCHARGING MACHINE

[75] Inventor: Makoto Sakaue, Aichi, Japan

[73] Assignee: Mitsubishi Denki K.K., Tokyo, Japan

[21] Appl. No.: 474,784

[22] PCT Filed: Jun. 26, 1989

[86] PCT No.: PCT/JP89/00630
  § 371 Date: Mar. 28, 1990
  § 102(e) Date: Mar. 28, 1990

[87] PCT Pub. No.: WO90/02013
  PCT Pub. Date: Aug. 3, 1990

[30] Foreign Application Priority Data

Aug. 19, 1988 [JP] Japan ................. 63-205984
Aug. 22, 1988 [JP] Japan ................. 63-207715
Dec. 9, 1988 [JP] Japan ................. 63-311555
Mar. 17, 1989 [JP] Japan ..................... 1-63833

[51] Int. Cl.$^5$ ............... B23H 7/06; B23H 7/18; B23H 7/20
[52] U.S. Cl. ...................................... 219/69.12
[58] Field of Search .............. 219/69.12, 69.14, 69.17, 219/69.16, 69.19; 364/474.04

[56] References Cited

U.S. PATENT DOCUMENTS 4,686,343 8/1987 Inoue .......................... 219/69.12
4,940,871 7/1990 Watanabe .................. 219/69.12

FOREIGN PATENT DOCUMENTS 56-27741   3/1981 Japan .
56-76343   6/1981 Japan ................. 219/69.12
163838    12/1981 Japan ................. 219/69.12
163843    12/1981 Japan ................. 219/69.14
57-66825   4/1982 Japan ................. 219/69.12
57-211455 12/1982 Japan .
58-202724 11/1983 Japan .
60-108218  6/1985 Japan .
44533      3/1986 Japan ................. 219/69.14
61-54529  11/1986 Japan .
63-26707   2/1988 Japan .
105822     5/1988 Japan ................. 219/69.12

Primary Examiner—Geoffrey S. Evans
Attorney, Agent, or Firm—Sughrue, Mion, Zinn Macpeak & Seas

[57] ABSTRACT

When, in a wire cut electric discharge machine, the wire electrode is broken during machining, it is automatically connected and returned to the wire electrode break point, and while the wire electrode is moved from the wire electrode break point to the machining start point, a cleaning material is jetted at the machined portion of the workpiece, thereby to allow the wire electrode to quickly return to the wire electrode break point.

19 Claims, 11 Drawing Sheets

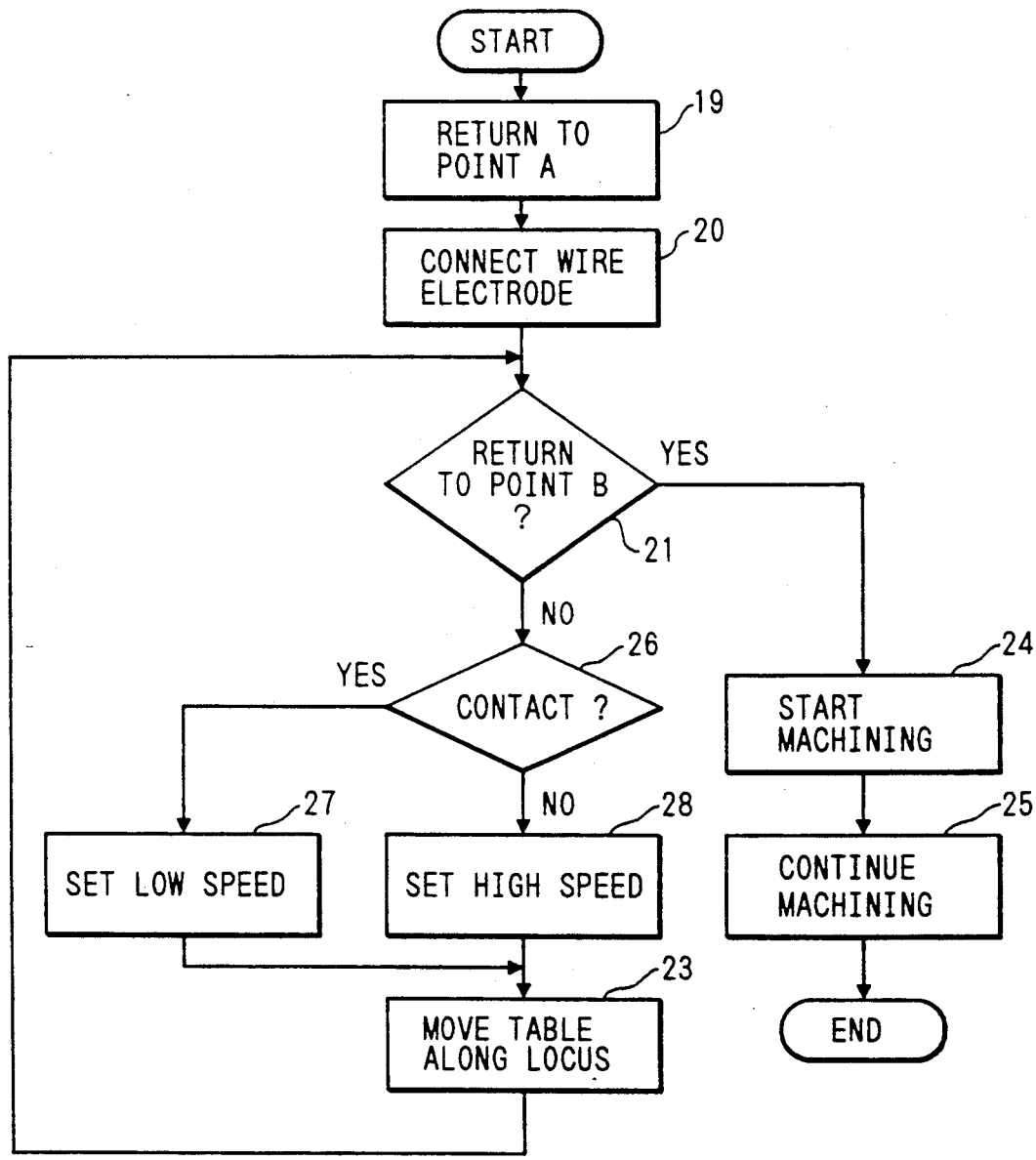

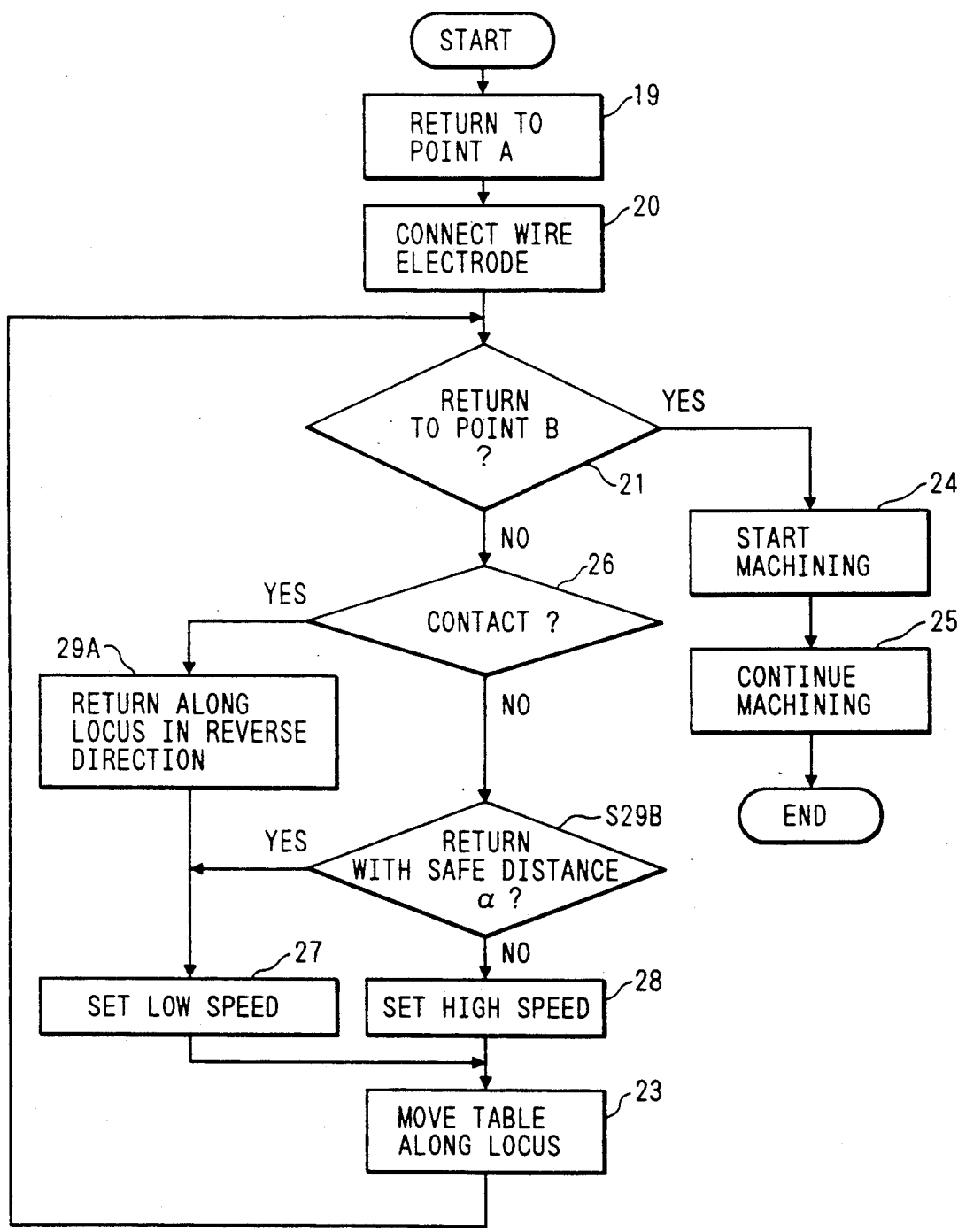

METHOD OF RETURNING A WIRE ELECTRODE WHEN BROKEN IN A WIRE CUT ELECTRIC DISCHARGING MACHINE

TECHNICAL FIELD

This invention relates to a method in which, when a wire electrode is broken during machining, the wire electrode is connected and returned to the position where the breakage of the wire electrode has occurred.

BACKGROUND ART

A wire cut electric discharge of this type is as shown in FIG. 1. In FIG. 1, reference numeral 1 designates a workpiece to be machined; 2, a movable table on which a workpiece is mounted; 3, a wire cut electric discharge machine body which operates to move the movable table 2 to machine the workpiece 1 with a wire electrode 4 and a machining solution; 5, a machining solution supplying unit for supplying a machining solution to the workpiece 1; 6, a numerical control unit for controlling the positions of the movable parts of the machine to perform a machining control operation and an automatic wire electrode returning operation; 7, an automatic wire electrode supplying unit for automatically connecting or cutting the wire electrode 4; and 8, a machining electric power unit for supplying electric power to cause electric discharge between the wire electrode 4 and the workpiece 1.

FIG. 2 is an explanatory diagram for a description of an automatic wire electrode returning operation which is carried out when the wire electrode is broken. In this case, the wire electrode is broken when it is on a path (e) after moving along paths (a), (b), (c) and (d). In FIG. 2, reference character (f) designates a wire electrode returning path which is extended from the point B where the wire electrode has been broken to the start point A.

FIG. 3 is a block diagram showing the internal control operation of the numerical control unit. In FIG. 3, reference numeral 9 designates an NC (numerical control) program for operating the machine body 3; 10, a program analyzing section for analyzing the NC program; 11, a machining solution controlling section for controlling the machining solution supplying unit 5 to supply the machining solution to the workpiece 1 and the wire electrode 4; 12, a wire electrode controlling section for turning on and off a wire electrode supplying operation, and for transmitting a wire electrode break signal and a contact signal representing the contact between the workpiece 1 and the wire electrode to a control section 13 (described later); 14, an automatic supply controlling section for controlling the automatic wire electrode supplying unit 7 to connect or cut the wire electrode 4; and 15, a machining input/output section for transmitting signals to and receiving signals from the machining solution controlling section 11, the wire electrode controlling section 12, and the automatic supply controlling section 14, to transmit the wire electrode break signal and the contact signal to the control section 13.

According to the output signal of the program analyzing section 10, the control section 13 applies a signal to a servo motor 16 to control the position of the movable table 2, and applies a signal to the machine input/output section 15 to perform the machining solution control, the wire electrode control, and the machining control. In addition, when the wire electrode is broken, the control section 13 performs all the control for automatically returning the wire electrode. Further in FIG. 3, reference numeral 17 designates a display controlling section for displaying data such as coordinates on a CRT (cathode ray tube) 18.

FIG. 4 is a flow chart for a description of the automatic wire electrode returning operation. In FIG. 4, reference numeral 19 designates a step of retuning the wire electrode to the initial hole A; 20, a step of causing the automatic wire electrode supplying unit 7 to connect the wire electrode 4; 21, a step of determining whether or not the wire electrode has been returned to the wire electrode break point B; 22, a step of setting a speed to return the wire electrode to the wire electrode break point B; 23, a step of returning the wire electrode along the locus to the wire electrode break point B 24, a step of starting the machining operation at the wire electrode break point B again; and 25, a step of continuing the machining operation.

The operation of the wire cut electric discharge machine thus constructed will be described with reference to FIGS. 1 through 4. The workpiece fixedly mounted on the movable table 2 is controlled in position by the numerical control unit 6, and is moved according to the NC program 9 analyzed by the program analyzing section 10. The machining wire electrode 4 and the machining solution supplying unit 5 are controlled by the machine input/output section 15. With the machining solution supplied by the machining solution supplying unit as an electric discharge medium, the electric discharge machining operation of the workpiece is carried out by using the machining electric power supplied by the machining electric power unit 8. The position of the movable table 2, and other data are displayed on the CRT 18 by the display controlling section 17.

Let us consider the case where the workpiece is machined as shown in FIG. 2. At the initial hole A, the wire electrode 4 is automatically connected by the automatic wire electrode supplying unit 7. When the wire electrode 4 is broken at the point B) on the path (e) after moving along the paths (a) through (d), the control section 13 applies an instruction signal to the automatic wire electrode supplying section so that the wire electrode 4 is cut at the point B, and then it is returned through the path (f) to the point A, where it is connected. Thereafter, the wire electrode is returned through the paths (a), (b), (c) and (d) to the point B, and the machining operation is carried out again.

The operation of returning the wire electrode from the point A to the point B is as indicated in the flow chart of FIG. 4. In step 19 the wire electrode is returned to the point A, and then in step 20 the wire electrode is connected at the point A. In step 21 it is determined whether or not the wire electrode has been returned to the point B. When it is determined that the wire electrode has not been returned to the point B yet, in step 22 a speed is set for returning the wire electrode to the point B, and in step 23 the movable table is moved along the locus. The speed set in step 22 has been determined by the control section in advance so that the wire electrode may not be broken again by being caught by the corner edges on the way to the point B. When the wire electrode is returned to the point B, in step 24 the machining operation is started again, and in step 25 the machining operation is continued.

The case where the wire electrode is broken for some reason will be described with reference to FIG. 5.

When the wire electrode 4 is broken at the point B in FIG. 2, the sludge 100 formed during machining has been stuck to the machining region of the workpiece 1 including the upper and lower surfaces, and the portions of the first and second wire guides 30 and 3 which are confronted with the workpiece 1, as shown in FIG. 5. FIG. 5 is an enlarged diagram showing essential components in FIG. 1. The sludge 100 is formed when the workpiece 1 and the wire electrode 4 are molten by the machining thermal energy.

The conventional wire cut electric discharge machine is constructed as described above. Therefore, when the wire electrode is returned to the point A after broken, it is difficult to automatically connect the wire electrode because of the sludge 100 stuck to the machining region of the workpiece including the upper and lower surfaces and to the first and second wire guides4s 30 and 32. Even if the automatic wire electrode connecting operation has been achieved, while returning from the point A to the point B the wire electrode may be broken again by the sludge 100.

In the conventional method of returning a wire electrode in a wire cut electric discharge machine, as shown in FIG. 2 the wire electrode is returned from the wire electrode break point B to the initial hole A, where it is automatically connected, and then it is returned along the paths (a) through (e) to the wire electrode break point B, as was described above. Therefore, if the returning paths form acute angles, the wire electrode may be broken while moving along the paths. In order to overcome this difficulty, it is necessary to set the wire electrode returning speed to a relatively low value. This means that it takes a relatively long period of time to return the wire electrode to the break point; that is, the conventional method has a problem to increase the wire electrode returning speed.

DISCLOSURE OF THE INVENTION

In view of the foregoing, an object of this invention is to provide a method of returning a wire electrode when broken in a wire cut electric discharge machine in which the wire electrode is automatically connected without fail and/or the wire electrode is never broken while being returned to the wire electrode break point where it was broken, and it can be quickly returned to the wire electrode break point from the machining start point.

In the method of the invention, first and second wire guides are arranged on both sides of a workpiece to be machined, for supporting a wire guide and guiding the wire guide thus supported to a machining portion of the workpiece, and an automatic electric wire supplying unit is provided which operate to return the wire electrode from a wire electrode break point where the wire electrode is broken during machining to a machining start point together with the first and second wire guides, and to automatically connect, at the machining start point, the wire electrode and set the wire electrode thus connected along a wire electrode supplying path, thus allowing the machining operation to start again, and in returning the wire electrode from the wire electrode break point to the machining start point (the initial hole) a cleaning material is jetted at the portions of the first and second guide members which are confronted with the workpiece, and the machined portion of the workpiece thereby to remove obstacles on the way to the machining start point.

In the invention, while the wire electrode is moved from the wire electrode break point to the machining start point, the cleaning material is jetted to remove sludge from the first and second wire guides and the machined portion of the workpiece.

In the method of the invention, the speed of returning the wire electrode to the wire electrode break point is changed according to conditions encountered on the way to the wire electrode break point.

In the invention, since the returning speed is changed according to conditions encountered on the way to the wire electrode break point as was described above, the wire electrode can be quickly returned to the wire electrode break point without being broken again.

In the method of the invention, in returning the wire electrode to the machining start point, the configuration of the locus formed in the workpiece by machining is read, so that the returning speed is set to a best value, whereby the wire electrode can be quickly returned when broken.

Further in the method of the invention, in returning the wire electrode to the wire electrode break point, it is detected whether or not the wire electrode contacts the workpiece to control the returning speed, as a result of which the wire electrode can be returned to the wire electrode break point without being broken again.

BRIEF DESCRIPTION OF THE DRAWINGS

FIG. 12 is a flow chart for a description of the internal control for returning a wire electrode when broken in a third embodiment of the invention. FIG. 14 is a flow chart for a description of the internal control for returning a wire electrode when broken in a fourth embodiment of the invention.

BEST MODE FOR CARRYING OUT THE INVENTION

One embodiment of this invention will be described with reference to the accompanying drawings.

Figure 6:
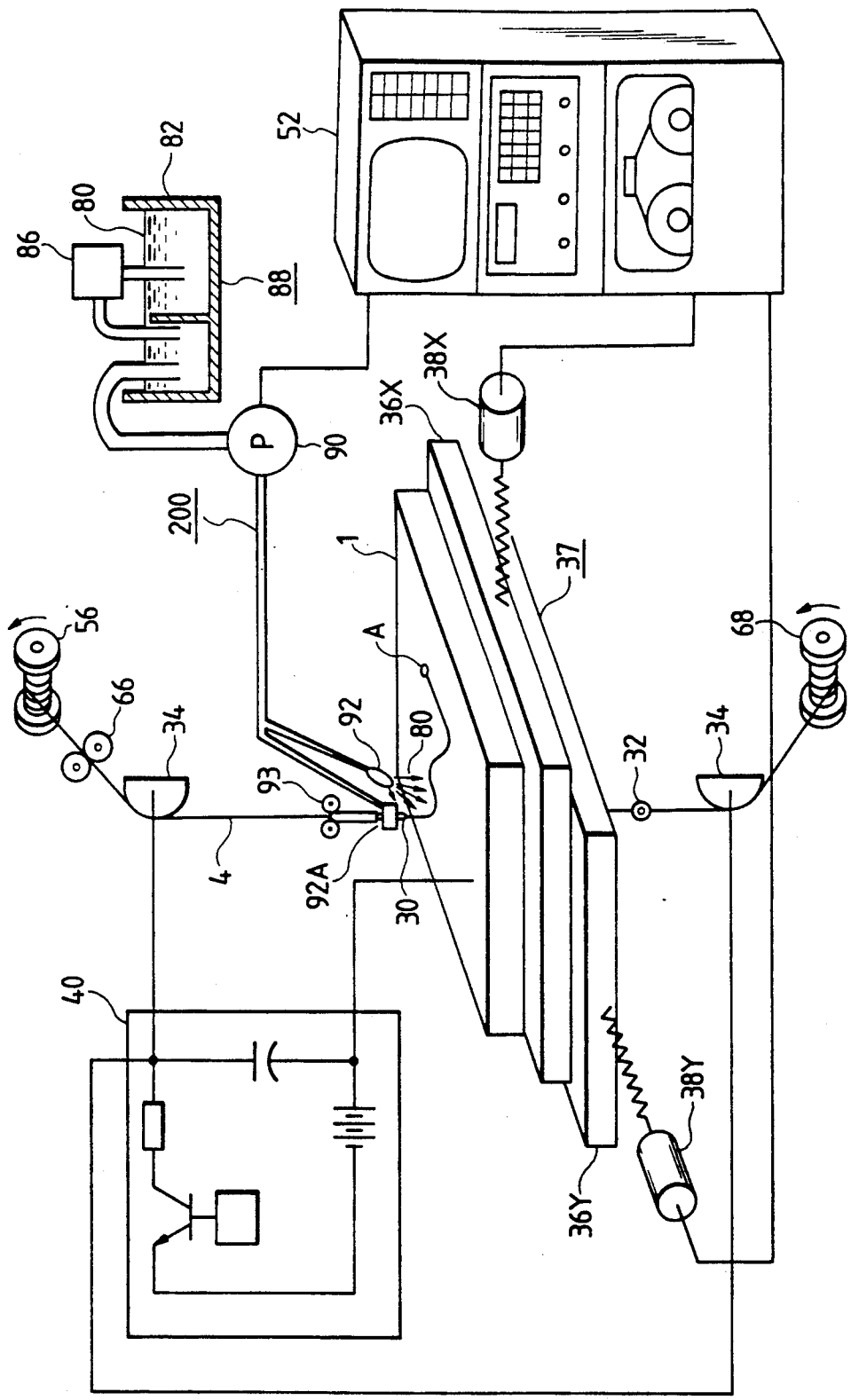
FIG. 6 is an explanatory diagram showing the arrangement of a wire cut electric discharge machine, a first embodiment of the invention.

FIG. 6 is an explanatory diagram showing the arrangement of a wire cut electric discharge machine with an automatic electric wire supplying unit according to the invention. In FIG. 6, reference numeral 1 designates a workpiece to be machined which is similar to that shown in FIG. 1; 36X, a first slide member which is reciprocated in an X-axis direction; 36Y, a second slide member which is reciprocated in a Y-axis direction; 37, a movable table comprising the first slide member 36X and the second slide member 36Y, on which the workpiece 1 is fixedly mounted; 38X, an X-axis servo motor for driving the first slide member 36X; 38Y, a Y-axis servo motor for driving the second slide member 36Y; 52, a numerical control unit for supplying control signals to the servo motors 38X and 38Y and controlling other control systems; 4, a wire electrode similar to that in FIG. 1; 56, a wire bobbin on which the wire electrode 4 has been wound; 30, a first wire guide which the wire electrode 4 penetrates, the first wire guide supporting the wire electrode 4 above the workpiece 1; 32, a second wire guide which the wire electrode 4 penetrates, the second wire guide supporting the wire electrode below the workpiece 1; 34, upper and lower electric feeders for supplying electric power between the wire electrode 4 and the workpiece 1; 66, a pair of tension rollers for tensioning the wire electrode 4; 68, a wire electrode take-up roller on which the wire electrode 4 used is wound; and 40, an electric power unit for supplying electric power to the feeders 34 and the workpiece 1.

Further in FIG. 6, reference numeral 80 designates a machining solution which is interposed, as an electric discharge medium, between the workpiece 1 and the wire electrode 4; 82, a machining solution vessel containing the machining solution 80; 86, a filter for filtering the machining solution 80; 88, a machining solution unit comprising the machining solution vessel 82 and the filter 86; 90, a pump for pumping the machining solution out of the machining solution unit 88; 92, a nozzle for jetting the machining solution into the machining gap formed between the workpiece 1 and the wire electrode 4; 93, an automatic wire electrode supplying unit which cuts the wire electrode 4 and then automatically connects it, and sets it in the wire electrode path; A, an initial hole; 92A, a cleaning nozzle disposed coaxial with the first wire guide 30, for jetting the machining solution 80, as a cleaning solution, to the workpiece 1; and 200, cleaning means comprising the pump 90, the cleaning nozzle 92a and the numerical control unit 52.

The ordinary machining operation of the electric discharge machine thus constructed will be described. The workpiece 1 is fixedly mounted on the movable table 37. The movable table 37 is moved in the X-axis direction and in the Y-axis direction by the X-axis servo motor 38X and the Y-axis servo motor 38Y which are driven in response to instruction signals from the numerical control unit 52. On the other hand, the wire electrode 4 pulled out of the wire bobbin 56 is automatically connected at the initial hole A by means of the automatic wire electrode supplying unit 93. The wire electrode thus connected, while being tensioned by the tension rollers 66, is run through the upper electric feeder 34, the automatic wire electrode supplying unit 93, the first wire guide 30, the4e workpiece 1, the second wire guide 32, and the lower electric feeder 34, and it is finally wound on the wire electrode take-up roller 68. In this operation, the electric power unit 40 applies the machining electric power through the electric feeders 34 to the wire electrode.

The machining solution 80 passed through the filter 86 in the machining solution unit 88 is pumped out by the pump, and supplied through the nozzle 92, as an electric discharge medium, to the machining gap between the workpiece 1 and the wire electrode 4. Under this condition, electric discharge is caused between the workpiece 1 and the wire electrode 4, so that the workpiece 4 is machined as controlled by the numerical control unit 52. This will be described with reference to FIG. 2 which has been used for a description of the prior art. First, at the start of the electric discharge machining operation, as was described above the wire electrode 4 is automatically connected at the initial hole A by the automatic wire electrode supplying unit 93. Then, the workpiece 1 is machined along the paths (a), (b), (c), (d) and (e) in the stated order.

Figure 2:
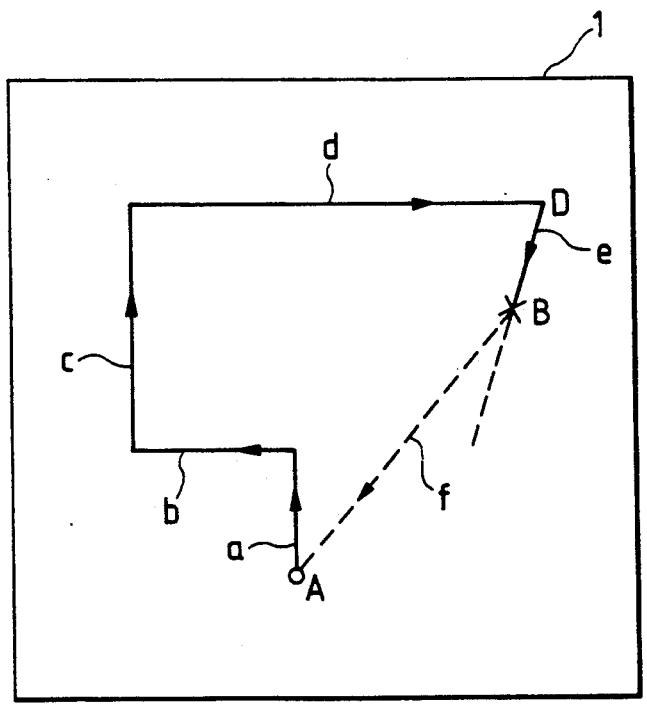
FIG. 2 is an explanatory diagram for a description of the operation of returning a wire electrode when broken in the conventional wire cut electric discharge machine.
Figure 7:
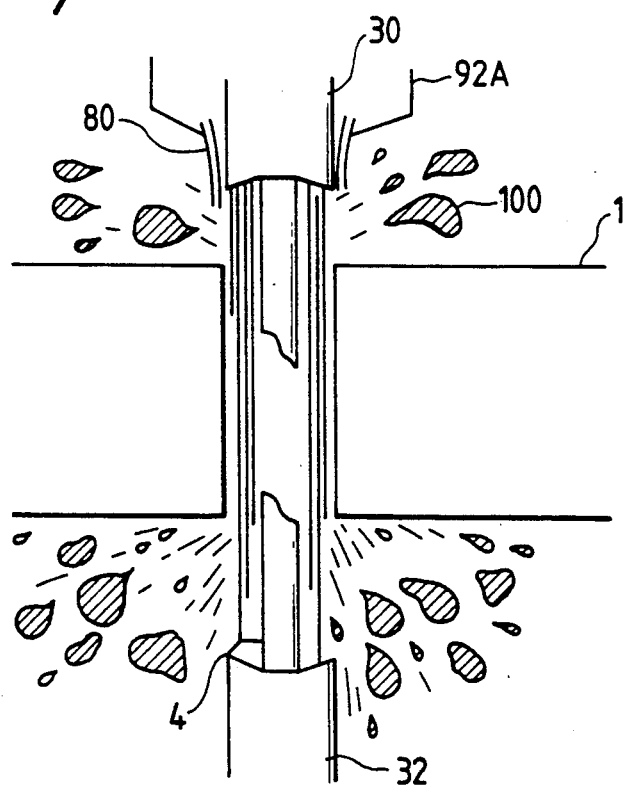
FIG. 7 is an explanatory diagram showing how the workpiece and its relevant components are cleaned in the first embodiment of the invention.

The operation in the case when the wire electrode 4 is broken because of short-circuit for instance during machining will be described with reference to FIG. 2. The wire electrode is returned from the wire electrode break point to the initial hole as follows: When the wire electrode 4 is broken at the point B because of short-circuit for instance, the machining operation is suspended, and at the point B the automatic wire electrode supplying unit 93 is operated to cut the wire electrode so that it can be readily connected. Under this condition, the movable table 37 is driven so as to move the first and second wire guides relative to it; that is, to move the wire electrode along the path (f). At the same time, the numerical control unit 52 outputs an instruction signal to start the pump 90, so that the machining solution is pumped out of the machining solution unit 88 and jetted through the cleaning nozzle 92A, as a cleaning solution, to the workpiece 1. While the cleaning solution being jetted in this manner, the wire electrode is returned to the initial hole along the path (f) as was described above. The jetting of the cleaning solution is suspended when the wire electrode reaches the initial hole A. During the above-described operation, the workpiece 1, the wire electrode 4, etc. are as shown in FIG. 7. More specifically, the sludge 100 is removed from the first and second wire guides 30 and 32 by the machining solution 8 jetted through the cleaning nozzle 92A, and from the machining region of the workpiece 1 including the upper and lower surfaces by the streams spread from the machining solution 80 thus jetted. Upon completion of this operation, similarly as in the ordinary initial operation, the automatic wire electrode supplying unit 93 operates to automatically connect the wire electrode 4, and the wire electrode thus connected is returned along the paths (a) through (e) to the point B, where the machining operation is started again.

Figure 8:
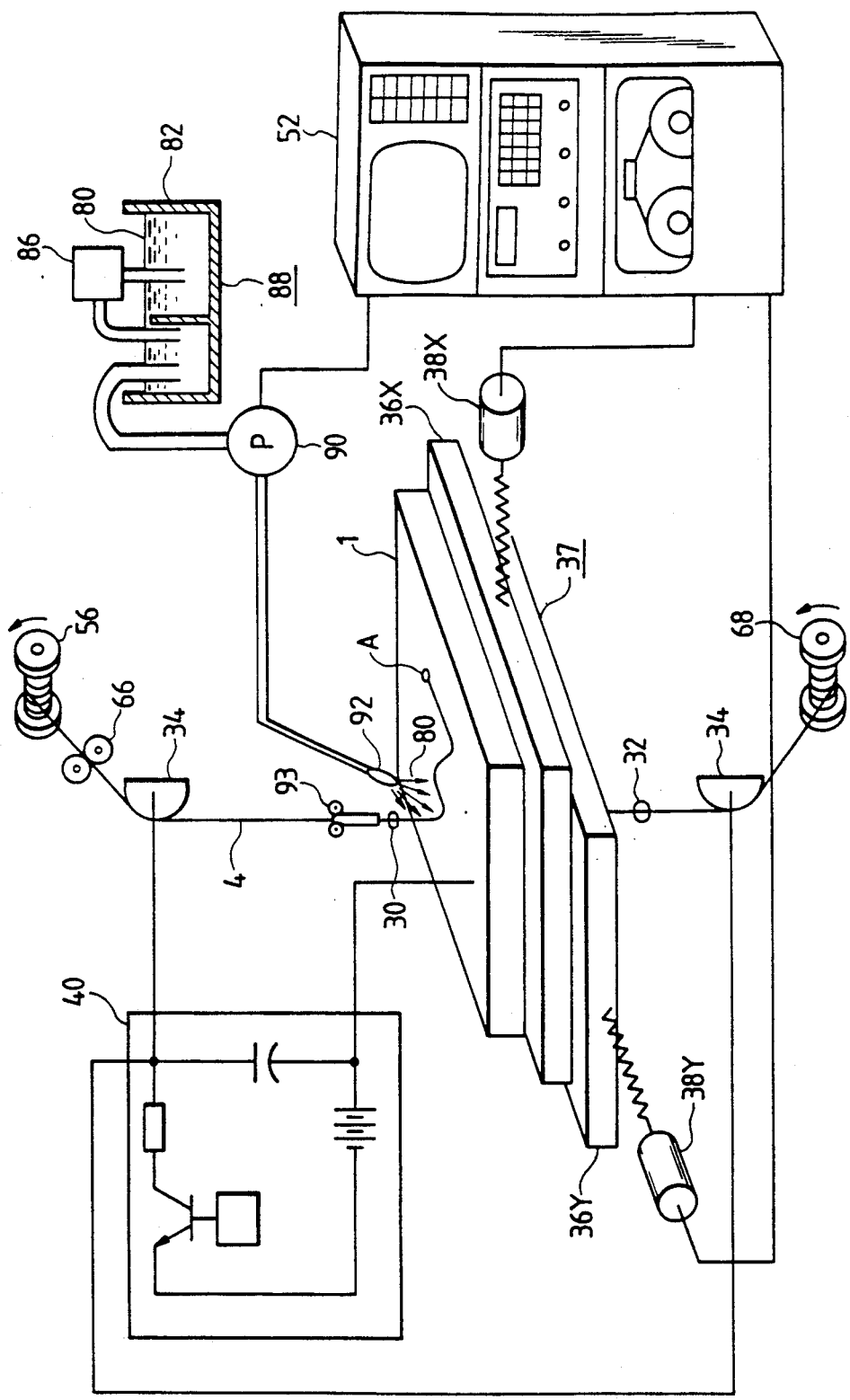
FIG. 8 is an explanatory diagram showing the arrangement of one modification of the first embodiment of the invention.

In the above-described embodiment, the cleaning nozzle 92A is provided at the first wire guide 30. However, it may be provided at the second wire guide 32, or it may be provided at each of the first and second wire guides 30 and 32. The same effect can be obtained by using the existing nozzle 92 as shown in FIG. 8. In FIG. 8, those components which have been already described with reference to FIG. 6 are therefore designated by the same reference numerals or characters.

In the above-described embodiment, the cleaning solution is the machining solution. However, the same effect can be obtained by using gas such as compressed air instead of the machining solution. In this case, it is necessary to modify the structure including the cleaning nozzle 92A to some extent; however, the description of the modification will not be made here.

In the above-described embodiment, the wire electrode is returned from the wire electrode break point to the machining start point along a line other than the machining locus. However, it goes without saying that, if the wire electrode is returned to the machining start point along the machining locus, then the machined part will be cleaned more effectively.

That is, in the first embodiment of the invention, in returning the broken wire electrode from the wire electrode break point to the machining start point, the first and second wire guides and the machining region of the workpiece are cleaned. Therefore, the automatic connection of the wire electrode can be achieved smoothly, and the machining operation can be started again with a complete wire electrode.

Figure 3:
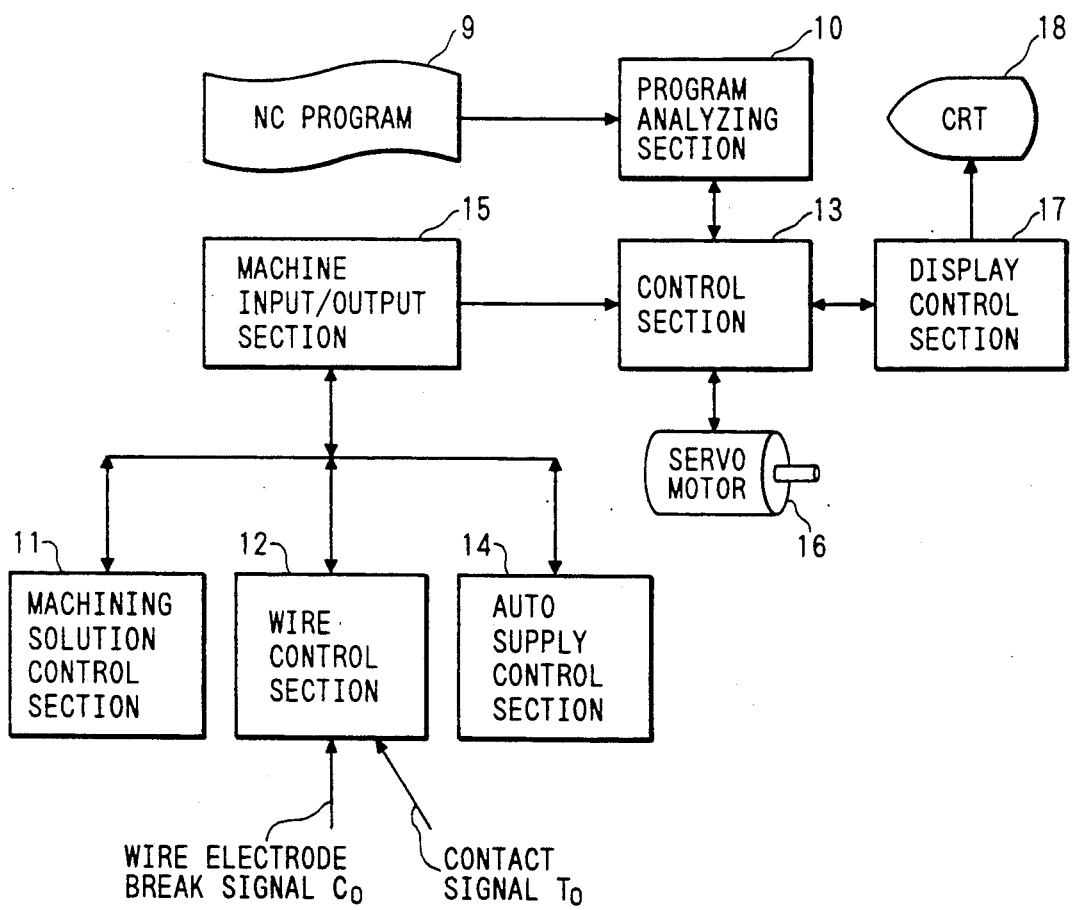
FIG. 3 is a block diagram showing the arrangement of essential components in a numerical control unit provided from the conventional wire cut electric discharge machine.
Figure 4:
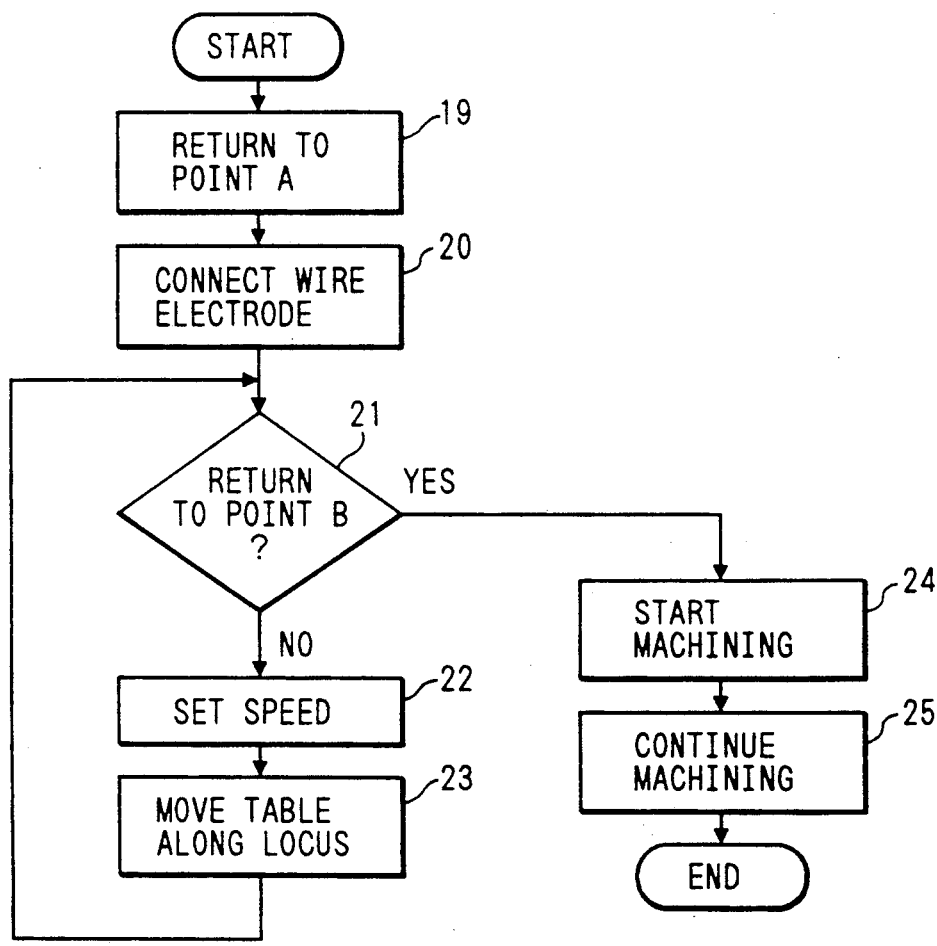
FIG. 4 is a flow chart for a description of a conventional method of returning a wire electrode when broken in the wire cut electric discharge machine.
Figure 5:
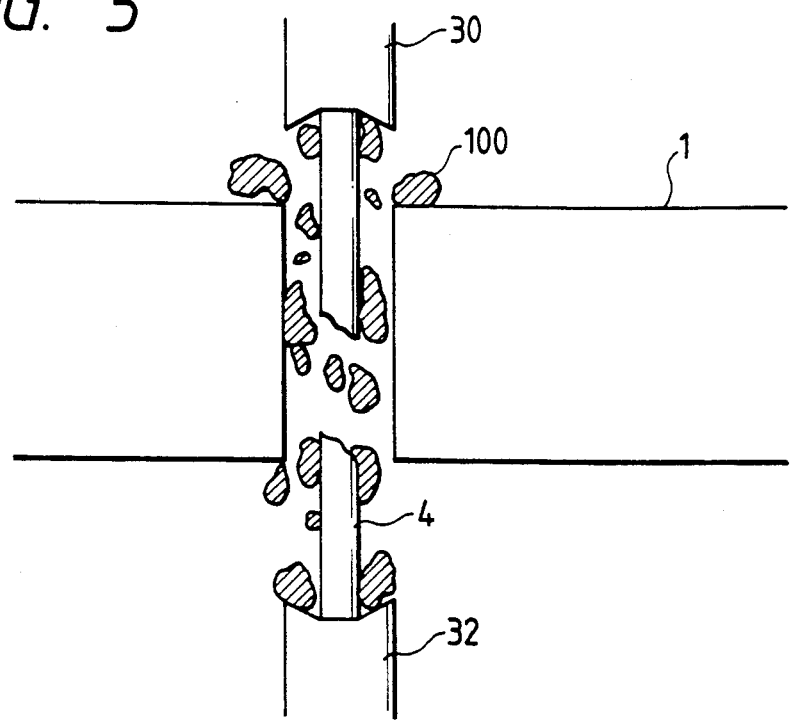
FIG. 5 is an explanatory diagram showing a wire electrode which has been broken while machining a workpiece.
Figure 9:
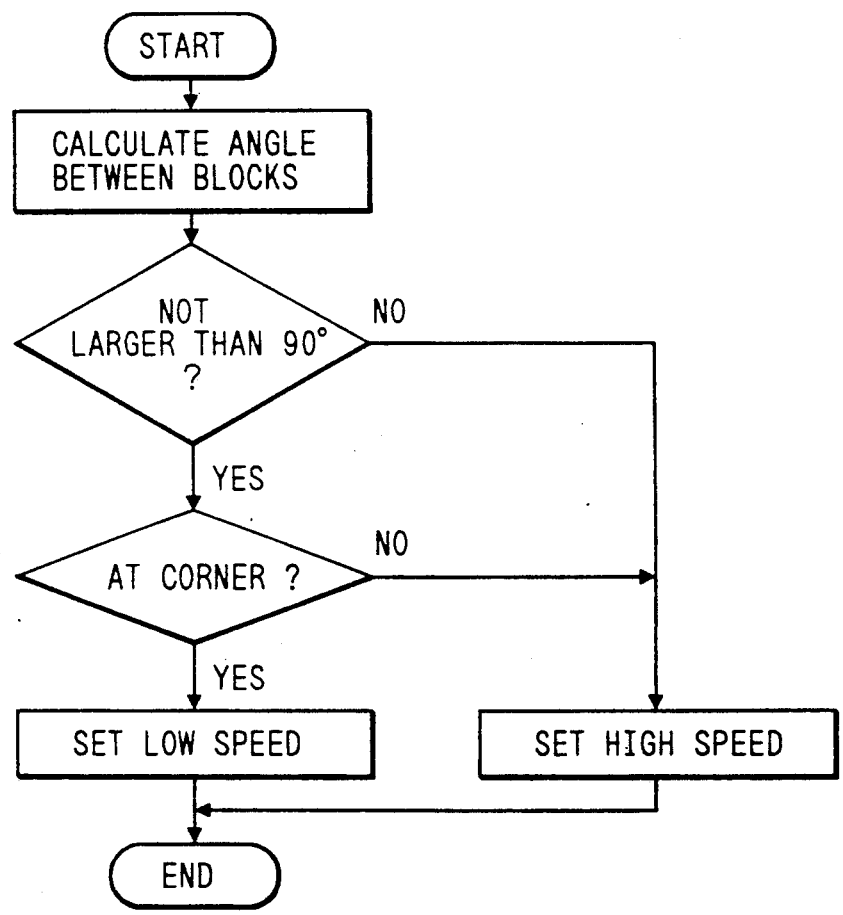
FIG. 9 is a flow chart for a description of the internal decision control for returning a wire electrode when broken in a second embodiment of the invention.
Figure 10:
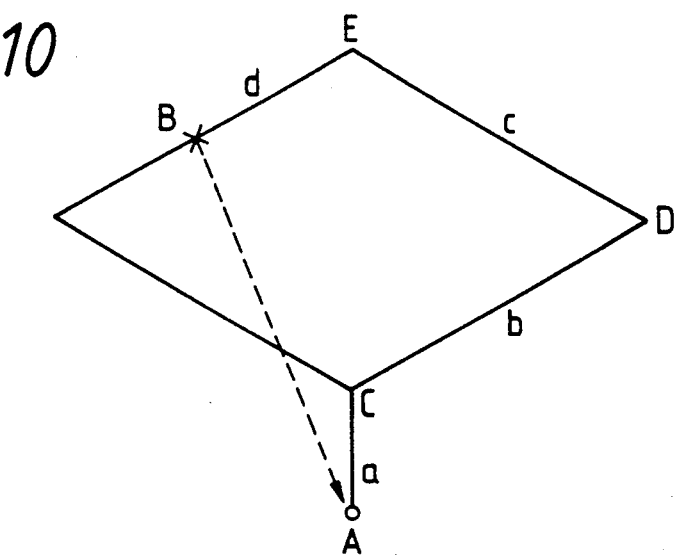
FIG. 10 is an explanatory diagram showing a machining locus which the wire electrode follows in two returning speed modes; a low returning speed mode and a high returning speed mode. The parts (a) and (b) of FIG. 11 are explanatory diagrams for a description of a method of discriminating corner angles in a machining locus.
Figure 11A:
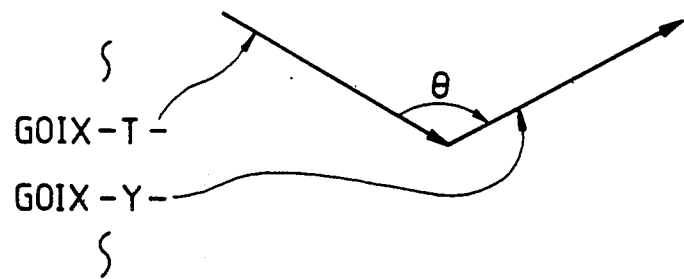
Figure 11B:
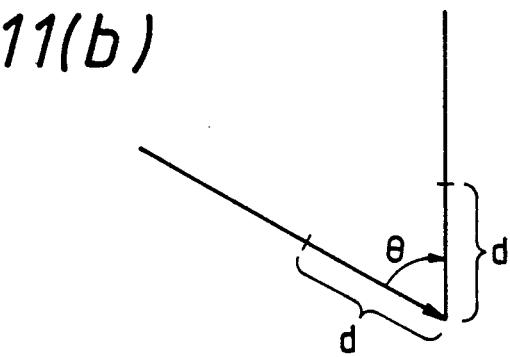

A second embodiment of the invention will be described with reference to FIGS. 9 through 11. In the second embodiment, its internal control arrangement is similar in arrangement to that which has been described with reference to FIG. 3, and therefore the second embodiment will be described with reference to FIGS. 1 through 4, too, when necessary. FIG. 9 is a flow chart for a description of the operation that, in the control section 13 in FIG. 3, the present block is compared with the next block, and a returning speed is determined according to the angle therebetween. FIG. 10 is an explanatory diagram for a description of the returning operation which includes two modes: a low speed return mode (D) and a high speed return mode. The parts (a) and (b) of FIG. 11 are explanatory diagrams for a description of a corner judging operation. In the case of the part (a) of FIG. 11, the corner angle is an obtuse angle larger than 90°, and the part (b) of FIG. 11 the corner angle is an acute angle smaller than 90°. In FIG. 11, reference character $\alpha$ designates the distance or region where the wire electrode returns at low speed. The judgment of the angle, and the determination of the region $\alpha$ are carried out by the program analyzing section 10 in FIG. 3.

Now, the operations of essential components of the second embodiment will be described with reference to FIGS. 9 through 11. It is assumed that, while the workpiece being machined as shown in FIG. 10, the wire electrode has been broken at the point B. In this case, the machine input/output section 15 (FIG, 3) applies a wire electrode break signal Co to the control section 13. In response to the signal, the control section 13 outputs a wire electrode cutting signal, so that the wire electrode is cut. The wire electrode thus treated is returned to the initial hole, the point A, in response to an instruction signal from the control section 13. Thereafter, the control section supplies a wire electrode connecting signal to the automatic wire electrode supplying unit 7 so as to connect the wire electrode. The wire electrode is moved along the paths a, b, c and d to the point B. In this operation, the angles at the corners C, D and E are calculated by the program analyzing section 10 in FIG. 3, and the control section 13 judges whether each angle is an obtuse angle or an acute angle. When, in the case where the angle between the present block and the next block is smaller than 90°, the remaining distance from the corner is within the data $\alpha$, a low returning speed is selected.

The high and low returning speeds have been preset in the control section. The returning speed is decreased only when the wire electrode goes around an acute corner, with the result that the entire returning speed is increased, and the difficulty can be eliminated that the wire electrode is broken being caught by the corner edge. The corner judging process is as shown in FIG. 9. The angle between the present block and the next block is calculated by the program analyzing section (FIG. 3) in advance. When it is an acute angle, the control section 13 reduces the returning speed to the low returning speed when the distance of the wire electrode from the corner becomes smaller than the specified data $\alpha$.

The second embodiment has been described with reference to the case where the returning speed is set to the two values; the high returning speed and the low returning speed. The same effect can be obtained by suspending the movement of the movable table at the tip of the corner for a short period of time.

Furthermore, in the second embodiment, the retuning speed is reduced when the wire electrode goes around an acute angle corner. In tapering a workpiece, the taper angle should be taken into consideration for more effects.

Figure 13:
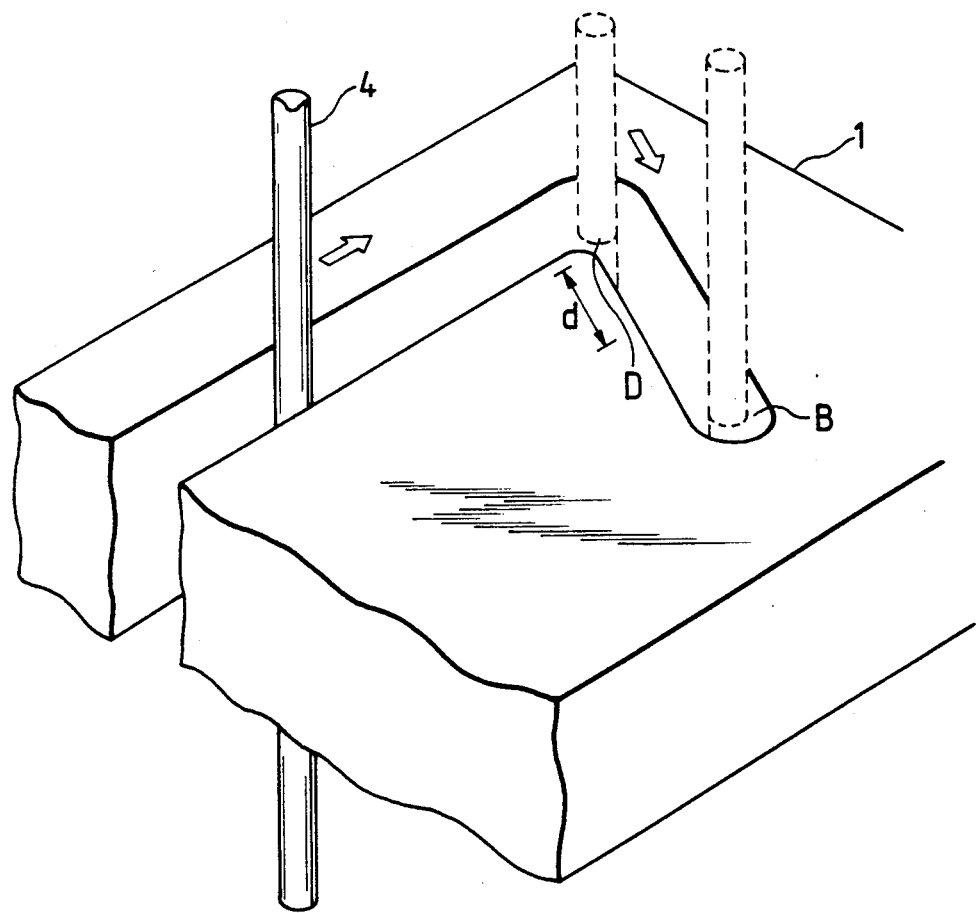
FIG. 13 is an explanatory diagram showing an acute corner of the machining locus formed in a workpiece.

A third embodiment of the invention will be described with reference to FIG. 12. FIG. 12 is a flow chart for a description of a wire electrode returning speed control operation. In FIG. 12, steps 19, 20, 21, 23, 24 and 25 are equal to those shown in FIG. 4. Further in FIG. 12, reference numeral 26 designates a step of reading the condition of contact between the wire electrode 4 and the workpiece 1 provided by the machine input/output section 15 (FIG. 3) thereby to select a best returning speed; 28, a step of selecting a low returning speed in which the returning speed is reduced to a value which is so low that, even when the movable table 2 is moved in the vicinity of the corner D for instance as shown in FIG. 13, the wire electrode 4 will not be broken by the corner D; and 28, a step of selecting a high returning speed in which, in the case of FIG. 13, the speed of the wire electrode returning to the corner D is set as high as possible.

In the case where the workpiece is machined as shown in FIG. 10, the wire electrode 4 is liable to be broken being caught by the corner D before reaching the wire electrode break point B.

Now, the operation of the third embodiment will be described. It is assumed that the wire electrode is broken at the point B in the path (e) of FIG. 2 during machining. In this case, the machine input/output section 15 applies the wire electrode break signal Co to the control section 13. In response to the signal, the control section 13 outputs the wire electrode cutting signal, which is applied to the automatic wire electrode supplying unit 7 so as to cut the wire electrode 4. After being cut, the wire electrode 4 is returned to the initial hole, the point A, according to the instruction signal provided by the control section 13. The control section applies the wire electrode connecting signal to the automatic wire electrode supplying unit 7. Thus, after being connected, the wire electrode 4 is returned along the paths (a) through (e) to the point B.

The operation of returning the wire electrode from the point A to the point B is as shown in the flow chart of FIG. 12. In step 19 the wire electrode is returned to the initial hole A, and in step 20 it is connected, and then it is returned to the wire electrode break point B. During this operation, the movable table 2 is moved as indicated in steps 26, 27, 28 and 23 in FIG. 12. Under normal conditions, while moving along the paths (a), (b), (c) and (d), the wire electrode 4 will not be brought into contact with the workpiece 1 because those paths are grooves machined in the workpiece, and as a result of the decision in step 26 the high returning speed is selected.

The corner D between the paths (d) and (e) is as shown in FIG. 13. If the wire electrode is allowed to go around the corner D at the high returning speed, then it may be broken being caught by the corner D. When the wire electrode 4 comes to the corner D, the direction of movement of the movable table is changed, so that the wire electrode is brought into contact with the workpiece 1, and the contact signal To is outputted.

In this case, as a result of the decision in step 26, the low returning speed is selected, so that the wire electrode can go around the corner D smoothly, not being broken.

The high returning speed and the low returning speed have been set in the control section in advance, and the returning speed is decreased only when the wire electrode is brought into the workpiece at a corner. This will increase the entire returning speed, and eliminate the difficulty that the wire electrode is broken being caught by a corner before reaching the wire electrode break point. Thus, with the third embodiment, the wire electrode can be returned with high reliability.

The third embodiment has been described with reference to the case where the high and low returning speeds are employed for returning the wire electrode. However, the same effect can be obtained by controlling the returning speed according to the condition of contact between the wire electrode and the workpiece.

A fourth embodiment of the invention will be described with reference to FIG. 14. FIG. 14 is a flow chart for a description of a wire electrode returning operation control operation. In FIG. 14, steps 19, 20, 21, 23, 24, 25, 26, 27 and 28 are the same as those shown in FIG. 12.

Further in FIG. 14, reference character 29A designates a step in which, when the wire electrode contacts the workpiece, the wire electrode is returned a predetermined distance to leave from the workpiece; and 29B, a step in which the low returning speed is selected while the wire electrode is returned the predetermined distance, and the safe distance $\alpha$.

Figure 1:
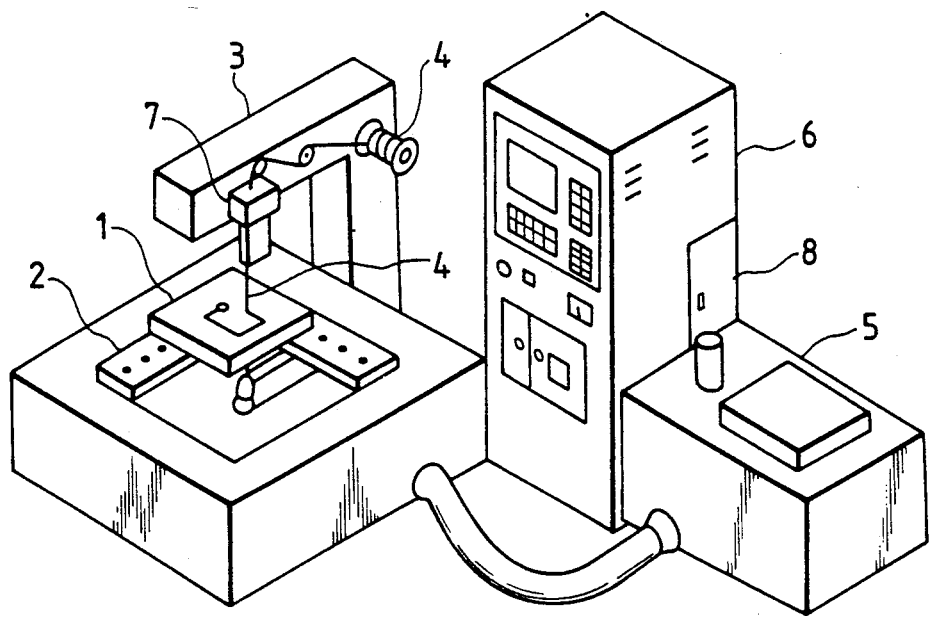
FIG. 1 is an explanatory diagram outlining the arrangement of a conventional wire cut electric discharge machine.

The operations of essential components of the fourth embodiment will be described with reference to FIGS. 2, 3, 13 and 14. When the wire electrode is broken at the point B in the path (e) while the workpiece is being machined as shown in FIG. 1, the machine input/output section 15 (FIG. 3) applies the wire electrode break signal to the control section 13. In response to the signal, the control section 13 outputs the wire cutting signal Co to the automatic wire electrode supplying unit 7. After being cut, the wire electrode is returned to the initial hole, the point A, according to the instruction signal provided by the control section 13. The control section 13 applies the wire electrode connecting signal to the automatic wire electrode supplying unit 7 so as to connect the wire electrode. The wire electrode thus treated is returned along the paths (a), (b), (c), (d) and (e) in the stated order.

The operation of returning the wire electrode from the point A to the point A is as indicated in FIG. 14. In step 19 the wire electrode 4 is returned to the initial hole A, and in step 20 the wire electrode is automatically connected, and it is returned to the point B. During this period, the movable table is moved according to steps 16, 27, 28 and 23.

When the wire electrode 4 is brought into contact with the workpiece 1, the contact signal To is outputted, And, as a result of the decision in step 16, the wire electrode is returned backwardly in step 29A until it leaves the workpiece. Then in step 27 the low returning speed is selected. The low retuning speed is employed while the wire electrode is moved the predetermined distance to leave the workpiece and the safe distance $\alpha$. Therefore, the wire electrode can go around the corner D without being caught by it.

The high returning speed, the low returning speed, and the safe distance $\alpha$ have been stored in the control section, and the returning speed is reduced only when the wire electrode contacts the workpiece at a corner, as a result of which the entire returning speed is increased, and the difficulty is eliminated that the wire electrode 4 is broken being caught by a corner. Thus, the wire electrode returning operation can be achieved with high reliability according to the invention.

As was described above, in the second through fourth embodiments of the invention, the speed of returning the wire electrode to the wire electrode break point which has been connected after broken is changed according to the conditions on the way to the wire electrode break point. Therefore, the wire electrode can be returned to the wire electrode break point quickly without being broken again, according to the invention.

INDUSTRIAL APPLICABILITY

This invention can be widely applied to the machining of a metal workpiece or the like with a wire cut electric discharge machine.

I claim:

1. A method of returning a wire electrode, when broken, in a wire cut electric discharge machine, comprising:

returning said wire electrode from a wire electrode break point where said wire electrode has been broken during machining to a machining start point together with first and second wire guides which support the wire electrode;

automatically reconnecting, at said machining start point, said wire electrode and setting said wire electrode thus reconnected out along a wire electrode supplying path, thus allowing the machining operation to start again; wherein in returning said wire electrode from said wire electrode break point to said machining start point, a cleaning material is jetted to portions of said first and second guide members which are confronted with said workpiece, and to at least some portion of the machined portion of said workpiece.

2. A method as claimed in claim (1), in which said cleaning material is jetted through a cleaning nozzle different from a nozzle which is used to supply a machining solution during machining.

3. A method as claimed in claim (1), in which said cleaning material is jetted through a nozzle which is used to supply a machining solution during machining.

4. A method as claimed in claim (1), in which said cleaning material is a cleaning solution.

5. A method as claimed in claim (1), in which said cleaning material is a gas.

6. A method as claimed in claim (1), in which, said wire electrode is returned from said wire electrode break point to said machining start point along the machining locus along which said workpiece has been machined, to thereby clean along said machining locus.

7. A method of returning a wire electrode, when broken, in a wire cut electric discharge machine, comprising:
returning said wire electrode to a machining start point by moving said wire electrode and a workpiece relative to each other;
reconnecting said wire electrode at said machining start point; and
returning said wire electrode thus reconnected along a machined locus along which said workpiece has been machined, to a wire electrode break point where said wire electrode was broken; and
controlling the speed of returning said wire electrode to said wire electrode break point according to conditions on the way back to said wire electrode break point.

8. A method as claimed in claim (7), in which said speed of returning said wire electrode to said wire electrode break point is changed according the configuration of the machining locus along which said workpiece has been machined.

9. A method as claimed in claim (8), in which said machining locus is analyzed by detecting a corner in said machining locus and detecting the angle of said corner, and when said angle of said corner is 90° or less, said speed of returning said wire electrode to said wire electrode break point is reduced proximate said corner.

10. A method as claimed in claim (7), in which said speed of returning said wire electrode to said wire electrode break point is reduced when said wire electrode and said workpiece are brought into contact with each other, and restored when said wire electrode and said workpiece break contact from each other.

11. A method as claimed in claim (7), in which said wire electrode is moved backward a predetermined distance along said locus with said speed of returning said wire electrode to said wire electrode break point reduced when said wire electrode and said workpiece are brought into contact with each other, and has speed thus reduced is restored when said wire electrode has moved at least a distance longer than said predetermined distance back toward said wire electrode break point at said speed thus reduced.

12. A method of returning a wire electrode, when broken, in a wire cut electric discharge machine of the type including
(a) wire guides for supporting the wire electrode and guiding said wire electrode thus supported to a machining location of a workpiece to be machined,
(b) means for moving said wire electrode relative to said workpiece, and for returning said wire electrode to a machining start point when broken during machining,
(c) wire reconnecting means for advancing said wire electrode along a wire electrode threading line, at said machining start point, and
(d) machining solution supplying means for supplying a machining solution during machining,
the method comprising:
producing a wire electrode break signal when said wire electrode is broken, and a contact signal when said wire electrode and said workpiece are brought into contact with each other;
moving said wire electrode relative to said workpiece in response to said wire electrode break signal, back to said machining start point, and simultaneously jetting a cleaning material at the portions of said wire guides which are confronted with said workpiece and at at least some portion of the machine portion of said workpiece, p1 reconnecting said wire electrode at said machining start point, and
returning said wire electrode thus reconnected along the machining locus along which said workpiece has been machined, to said wire electrode break point at a returning speed which is determined according to conditions on the way back to said wire electrode break point; said returning step further comprising:
reducing said returning speed when a corner angle of said machining locus is 90° or less.

13. A method of returning a wire electrode, when broken, in a wire cut electric discharge machine of the type including
(a) wire guides for supporting the wire electrode and guiding said wire electrode thus supported to a machining location at a workpiece to be machined,
(b) means for moving said wire electrode relative to said workpiece, and for returning said wire electrode to a machining start point when broken during machining,
(c) wire connecting means for advancing said wire electrode along a wire electrode threading line, at said machining start point, and
(d) machining solution supplying means for supplying a machining solution during machining, and
(e) means for generating a wire electrode break signal when said wire electrode is broken,
the method comprising:
moving said wire electrode relative to said workpiece to said machining start point, in response to said wire electrode break signal;
reconnecting said wire electrode thus broken at said machining start point, and
returning said wire electrode thus reconnected along a machining locus along which said workpiece has been machined, to said wire electrode break point at a returning speed which is determined according to conditions on the way to said wire electrode break point,
said returning speed being reduced when a corner angle of said machining locus is 90° or less.

14. A method of returning a wire electrode, when broken, in a wire cut electric discharge machine of the type including
(a) wire guides for supporting the wire electrode and guiding said wire electrode thus supported to a machining location of a workpiece to be machine,
(b) means for moving said wire electrode relative to said workpiece, and for returning said wire electrode to a machining start point when broken during machining,
(c) wire connecting means for advancing said wire electrode along a wire electrode threading line, at said machining start point, and
(d) machining solution supplying means for supplying a machining solution during machining, and
(e) means for producing a wire electrode break signal when said wire electrode is broken, and a contact signal when said wire electrode and said workpiece are brought into contact with each other, the method comprising:

moving said wire electrode relative to said workpiece to said machining start point in response to said break signal;

reconnecting said wire electrode at said machining start point, and returning said wire electrode thus reconnected along the machining locus along which said workpiece has been machined, to said wire electrode break point at a returning speed determined according to conditions on the way back to said wire electrode break point, said returning speed being reduced when a corner angle of said machining locus is 90° or less.

15. A method of returning a wire electrode to a wire break point in a wire-cut electric discharge machine comprising:

returning the broken wire electrode and an associated guide means from the wire break position to a machining start point by relatively moving the wire electrode and a workpiece;

reconnecting the wire electrode through the workpiece at said machining start point;

returning the reconnected wire electrode to the wire break point along a machined locus along which said workpiece has been machined; and controlling the speed of returning the wire electrode to the wire break point according to the configuration of the machining locus.

16. A method of returning a wire electrode, when broken, in a wire cut electric discharge machine of the type including (a) wire guides for supporting the wire electrode and guiding said wire electrode thus supported to a machining location of a workpiece to be machined, (b) means for moving said wire electrode relative to said workpiece, and for returning said wire electrode to a machining start point when broken during machining, (c) wire reconnecting means for advancing said wire electrode along a wire electrode threading line, at said maching start point, and (d) machining solution supplying means for supplying a machining solution during machining, the method comprising:

producing a wire electrode break signal when said wire electrode is broken, and a contact signal when said wire electrode and said workpiece are brought into contact with each other;

moving said wire electrode relative to said workpiece in response to said wire electrode break signal, back to said machining start point, and simultaneously jetting a cleaning material at the portions of said wire guides which are confronted with said workpiece and at at least some portion of the machined portion of said workpiece, reconnecting said wire electrode at said machining start point, and returning said wire electrode thus reconnected along the machining locus along which said workpiece has been machined, to said wire electrode break point at a returning speed which is determined according to conditions on the way back to said wire electrode break point; said returning step further comprising:

reducing said returning speed in response to said contact signal.

17. A method of returning a wire electrode, when broken, in a wire cut electric discharge machine of the type including (a) wire guides for supporting the wire electrode and guiding said wire electrode thus supported to a machining location of a workpiece to be machined, (b) means for moving said wire electrode relative to said workpiece, and for returning said wire electrode to a machining start point when broken during machining, (c) wire reconnecting means for advancing said wire electrode along a wire electrode threading line, at said machining start point, and (d) machining solution supplying means for supplying a machining solution during machining, the method comprising:

producing a wire electrode break signal when said wire electrode is broken, and a contact signal when said wire electrode and said workpiece are brought into contact with each other;

moving said wire electrode relative to said workpiece in response to said wire electrode break signal, back to said machining start point, and simultaneously jetting a cleaning material at the portions of said wire guides which are confronted with said workpiece and at at least some portion of the machined portion of said workpiece, reconnecting said wire electrode at said machining start point, and returning said wire electrode thus reconnected along the machining locus along which said workpiece has been machined, to said wire electrode break point at a returning speed which is determined according to conditions on the way back to said wire electrode break point; said returning step further comprising:

moving said wire electrode backward a predetermined distance in response to said contact signal, and thereafter moving said wire electrode in a forward direction at a reduced speed for a distance greater than said predetermined distance.

18. A method of returning a wire electrode, when broken, in a wire cut electric discharge machine of the type including (a) wire guides for supporting the wire electrode and guiding said wire electrode thus supported to a machining location of a workpiece to be machined, (b) means for moving said wire electrode relative to said workpiece, and for returning said wire electrode to a machining start point when broken during machining, (c) wire connecting means for advancing said wire electrode along a wire electrode threading line, at said machining start point, and (d) machining solution supplying means for supplying a machining solution during machining, and (e) means for producing a wire electrode break signal when said wire electrode is broken, and a contact signal when said wire electrode and said workpiece are brought into contact with each other, the method comprising:

moving said wire electrode relative to said workpiece to said machining start point in response to said break signal;

reconnecting said wire electrode at said machining start point, and returning said wire electrode thus reconnected along the machining locus along which said workpiece has been machined, to said wire electrode break point at a returning speed determined according to conditions on the way back to said wire electrode break point, said returning speed being reduced in response to said contact signal.

19. A method of returning a wire electrode, when broken, in a wire cut electric discharge machine of the type including (a) wire guides for supporting the wire electrode and guiding said wire electrode thus supported to a machining location of a workpiece to be machined, (b) means for moving said wire electrode relative to said workpiece, and for returning said wire electrode to a machining start point when broken during machining, (c) wire connecting means for advancing said wire electrode along a wire electrode threading line, at said machining start point, and (d) machining solution supplying means for supplying a machining solution during machining, and (e) means for producing a wire electrode break signal when said wire electrode is broken, and a contact signal when said wire electrode and said workpiece are brought into contact with each other, the method comprising:

moving said wire electrode relative to said workpiece to said machining start point in response to said break signal;

reconnecting said wire electrode at said machining start point, and returning said wire electrode thus reconnected along the machining locus along which said workpiece has been machined, to said wire electrode break point at a returning speed determined according to conditions on the way back to said wire electrode break point, and during said returning step, moving said wire electrode backward a predetermined distance in response to said contact signal, and moving said wire electrode in a forward direction at a reduced speed for a distance greater than said predetermined distance.

* * * * *